US012440319B2

(12) United States Patent
Thomas

(10) Patent No.: US 12,440,319 B2
(45) Date of Patent: Oct. 14, 2025

(54) DISPOSABLE DENTAL AEROSOL DEVICE

(71) Applicant: Stoma Ventures, LLC, Chesterfield, MO (US)

(72) Inventor: Charles Thomas, Vero Beach, FL (US)

(73) Assignee: STOMA VENTURES, LLC, Chesterfield, MO (US)

( * ) Notice: Subject to any disclaimer, the term of this patent is extended or adjusted under 35 U.S.C. 154(b) by 263 days.

(21) Appl. No.: 17/007,246

(22) Filed: Aug. 31, 2020

(65) Prior Publication Data
US 2021/0338398 A1  Nov. 4, 2021

Related U.S. Application Data

(63) Continuation-in-part of application No. 16/865,843, filed on May 4, 2020, now abandoned.

(51) Int. Cl.
*A61C 17/12* (2006.01)
*A61C 17/06* (2006.01)

(52) U.S. Cl.
CPC ............ *A61C 17/13* (2019.05); *A61C 17/092* (2019.05)

(58) Field of Classification Search
CPC ....... A61C 17/08; A61C 17/06; A61C 17/092; A61C 17/13; A61C 17/10; A61M 1/84; A61M 1/74
USPC .......................................................... 433/95
See application file for complete search history.

(56) References Cited

U.S. PATENT DOCUMENTS

| | | | | | |
|---|---|---|---|---|---|
| 855,888 | A | * | 6/1907 | Hecker | A61C 17/08 433/91 |
| 1,155,342 | A | * | 10/1915 | De Witt | A61C 17/08 433/94 |
| 1,596,754 | A | * | 8/1926 | Moschelle | A61M 27/00 604/541 |
| 1,928,992 | A | * | 10/1933 | Masterman | B29D 23/001 138/45 |
| 1,986,751 | A | * | 1/1935 | Robinson | A61C 17/08 433/91 |
| 2,670,539 | A | * | 3/1954 | Wall | A61C 17/08 433/96 |
| 3,528,427 | A | * | 9/1970 | Sheridan | A61M 27/00 604/45 |
| 3,881,254 | A | * | 5/1975 | Epstein | A61C 17/08 433/96 |

(Continued)

FOREIGN PATENT DOCUMENTS

| | | | | |
|---|---|---|---|---|
| DE | 102007006613 A1 | * | 8/2008 | ........... A61C 17/043 |
| EP | 1380268 A1 | * | 1/2004 | ........... A61C 17/043 |

(Continued)

OTHER PUBLICATIONS

Wellmann, Peter, "DE_102007006613_A1_I_tanslated" (Year: 2008).*

*Primary Examiner* — Heidi M Eide
*Assistant Examiner* — Holly T. To
(74) *Attorney, Agent, or Firm* — David H. Chervitz

(57) ABSTRACT

A disposable dental aerosol device has a tube having a tip end having a tip having a tip opening, a valve receiving end having a rear end opening, and an aerosol directing device having an aerosol collecting funnel, a first vane, a second vane, a first aerosol capturing port formed between the first vane and the second vane, and a second aerosol capturing port formed between the second vane and the first vane.

14 Claims, 14 Drawing Sheets

(56) References Cited

U.S. PATENT DOCUMENTS

| | | | | |
|---|---|---|---|---|
| 3,890,712 A * | 6/1975 | Lopez | ............... | A61C 17/08 |
| | | | | 433/92 |
| 3,965,901 A * | 6/1976 | Penny | ............... | A61M 1/87 |
| | | | | 604/119 |
| 4,058,896 A * | 11/1977 | Moore | ............... | A61C 17/08 |
| | | | | 433/91 |
| 4,074,435 A * | 2/1978 | Orsing | ............... | A61C 17/08 |
| | | | | 433/96 |
| 4,204,328 A * | 5/1980 | Kutner | ............... | A61M 1/7415 |
| | | | | 15/418 |
| 4,265,621 A * | 5/1981 | McVey | ............... | A61C 17/092 |
| | | | | 433/91 |
| 4,650,463 A * | 3/1987 | LeVeen | ............... | A61M 1/84 |
| | | | | 604/128 |
| 4,767,404 A | 8/1988 | Renton | | |
| 4,776,793 A * | 10/1988 | La Rocca | ............... | A61C 17/08 |
| | | | | 433/96 |
| 4,865,545 A * | 9/1989 | La Rocca | ............... | A61C 17/08 |
| | | | | 433/96 |
| 4,867,747 A * | 9/1989 | Yarger | ............... | A61M 1/84 |
| | | | | 604/902 |
| 5,114,342 A * | 5/1992 | Young | ............... | A61C 17/08 |
| | | | | 433/95 |
| 5,127,411 A | 7/1992 | Schoolman et al. | | |
| 5,334,019 A * | 8/1994 | Goldsmith | ............... | A61C 3/025 |
| | | | | 451/100 |
| 5,378,150 A | 1/1995 | Harrel | | |
| 5,489,276 A * | 2/1996 | Jamshidi | ............... | A61C 17/08 |
| | | | | 604/268 |
| 5,738,519 A | 4/1998 | Tenniswood | | |
| 5,741,134 A * | 4/1998 | Davis | ............... | A61C 17/08 |
| | | | | 433/91 |
| 5,827,061 A * | 10/1998 | Goodman | ............... | A61C 17/08 |
| | | | | 433/93 |
| 6,183,254 B1 * | 2/2001 | Cohen | ............... | A61C 17/08 |
| | | | | 433/92 |
| 6,186,783 B1 * | 2/2001 | Brassil | ............... | A61C 17/08 |
| | | | | 433/91 |
| 7,238,023 B1 * | 7/2007 | Enos | ............... | A61C 17/08 |
| | | | | 433/91 |
| 7,335,023 B2 * | 2/2008 | Mahlmann | ............... | A61C 17/08 |
| | | | | 433/136 |
| D739,005 S | 9/2015 | Matsumura | | |
| 9,532,857 B2 | 1/2017 | Ronto | | |
| 9,737,385 B1 * | 8/2017 | Kumar | ............... | A61C 17/08 |
| 9,888,989 B2 * | 2/2018 | Ishizaki | ............... | A61C 17/12 |
| 10,737,001 B2 * | 8/2020 | Yarger | ............... | A61M 1/84 |
| 11,517,336 B2 * | 12/2022 | Bair | ............... | A61M 1/84 |
| 2003/0017433 A1 * | 1/2003 | Reiz | ............... | A61C 17/08 |
| | | | | 433/140 |
| 2003/0124484 A1 | 7/2003 | Reiz | | |
| 2005/0175961 A1 * | 8/2005 | March | ............... | A61C 17/08 |
| | | | | 433/91 |
| 2005/0250071 A1 * | 11/2005 | Chu | ............... | A61C 17/08 |
| | | | | 433/91 |
| 2007/0203449 A1 * | 8/2007 | Yarger | ............... | A61M 1/84 |
| | | | | 604/35 |
| 2008/0076088 A1 * | 3/2008 | Brown | ............... | A61C 1/0046 |
| | | | | 433/91 |
| 2010/0297577 A1 * | 11/2010 | Cohen | ............... | A61M 1/79 |
| | | | | 210/85 |
| 2011/0070556 A1 * | 3/2011 | Haapasalo | ............... | A61C 17/08 |
| | | | | 433/92 |
| 2011/0301634 A1 * | 12/2011 | Aklog | ............... | A61M 1/3621 |
| | | | | 606/200 |
| 2014/0170595 A1 * | 6/2014 | Williams | ............... | A61C 17/135 |
| | | | | 433/95 |
| 2015/0164624 A1 * | 6/2015 | White | ............... | A61C 17/08 |
| | | | | 433/91 |
| 2016/0015477 A1 * | 1/2016 | Ellis | ............... | A61C 1/0061 |
| | | | | 433/95 |
| 2017/0224283 A1 * | 8/2017 | Kassab | ............... | A61B 5/0084 |
| 2020/0155284 A1 * | 5/2020 | Baker | ............... | A61C 17/08 |
| 2022/0183808 A1 * | 6/2022 | Shih | ............... | A61C 17/13 |

FOREIGN PATENT DOCUMENTS

| | | | | |
|---|---|---|---|---|
| EP | 3981356 A1 * | 4/2022 | ............ | A61C 17/043 |
| UA | 32684 U * | 5/2008 | | |
| WO | WO-8800481 A1 * | 1/1988 | | |
| WO | WO-9631170 A1 * | 10/1996 | ............ | A61C 17/043 |
| WO | WO-9920201 A1 * | 4/1999 | ............ | A61C 17/043 |
| WO | WO-9947068 A1 * | 9/1999 | ............ | A61C 1/088 |
| WO | WO 2008/113670 | 9/2008 | | |
| WO | WO-2008113670 A1 * | 9/2008 | ............ | A61C 17/043 |
| WO | WO-2020122346 A1 * | 6/2020 | ............ | A61C 17/08 |

* cited by examiner

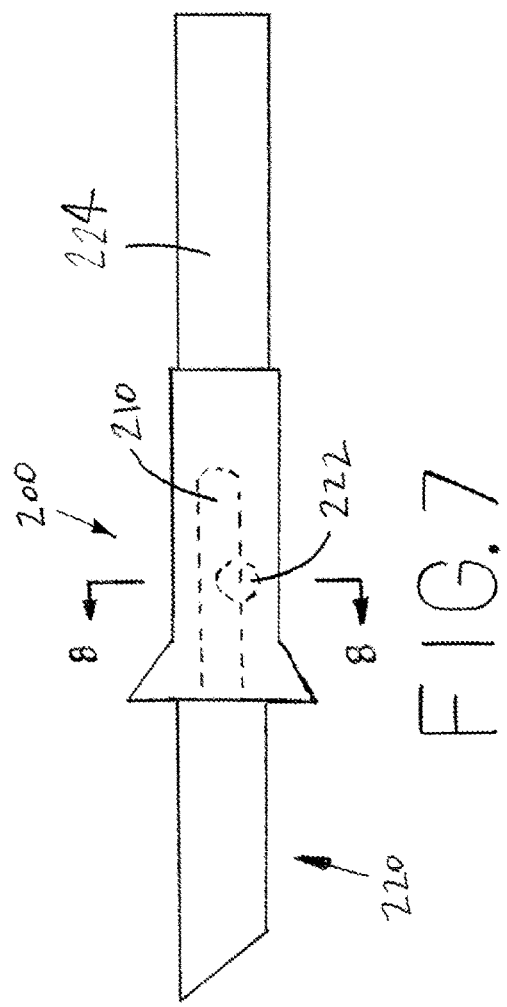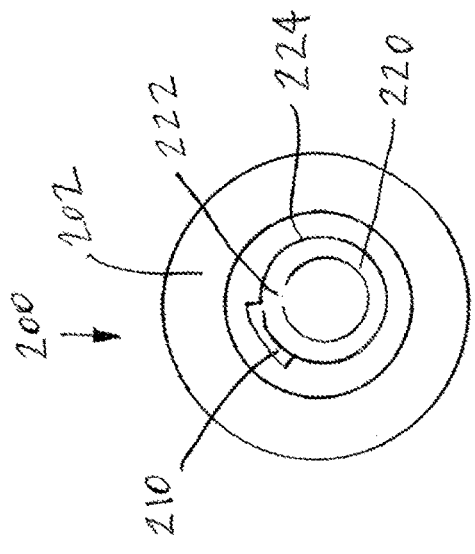

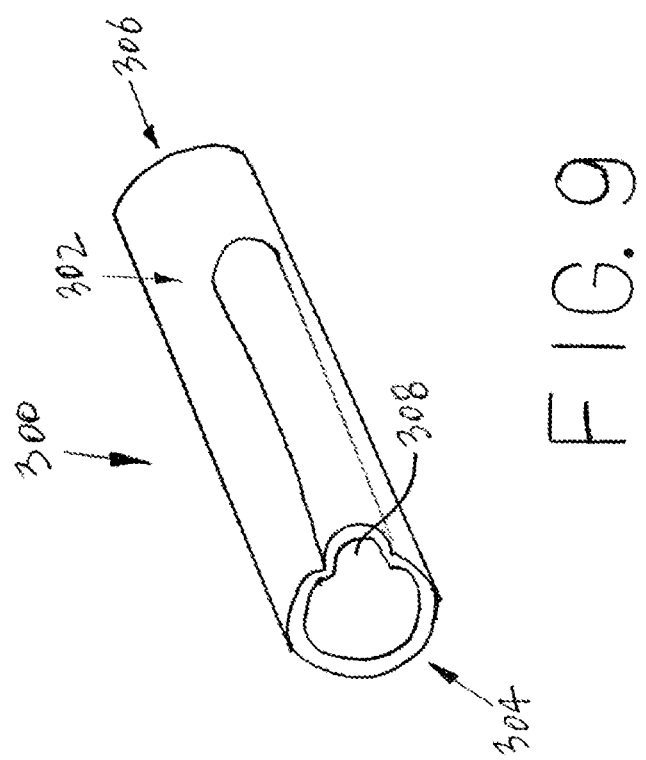

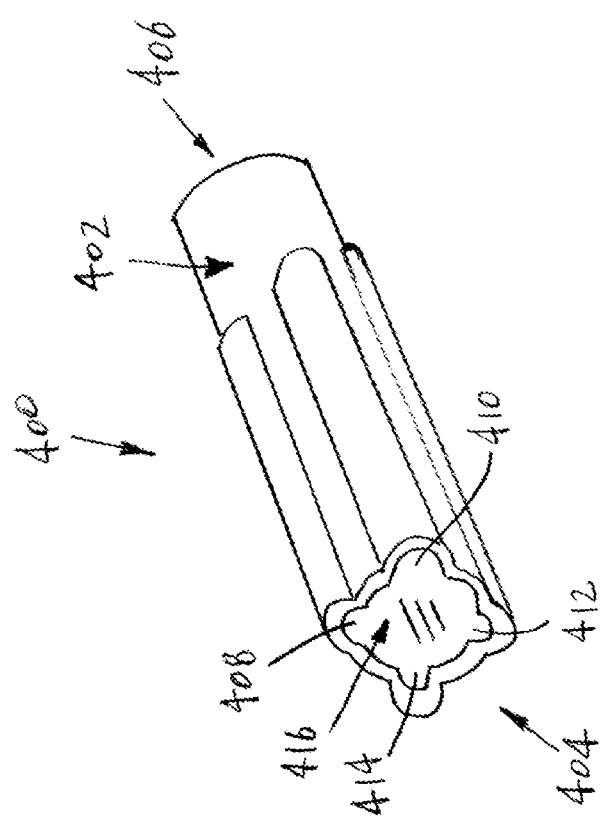

DISPOSABLE DENTAL AEROSOL DEVICE

RELATED APPLICATION

This application is a continuation-in-part of U.S. patent application Ser. No. 16/865,843, filed on May 4, 2020, the disclosure of which is incorporated herein by reference.

BACKGROUND

This disclosure relates to a disposable dental aerosol device for use during a dental procedure and more particularly to a disposable dental aerosol suctioning device for capturing saliva, debris, and other fluids that aerosol or spray from a mouth of a patient during a dental procedure.

During a dental procedure it is important to be able to remove saliva, blood, water, tooth fragments, metals, and other debris or fluids from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector or a low volume ejector. A saliva ejector typically comprises a plastic flexible tube for placement in the mouth of a patient. The saliva ejector tube is connected to a valve which in turn is connected via suction tubing to a source of vacuum. In this manner, saliva is passed through the ejector tube, the valve, and the tubing to be disposed of in a sanitary manner. Once the procedure is completed, the ejector should be discarded and the valve should be sterilized by autoclave to be used again. Although it is suggested to autoclave the valve after each use, it is known that the autoclave procedure is hardly ever done. Another device that is capable of removing solid materials is a high volume evacuator system. A high volume evacuator system generally consists of a tube that may be inserted into a mouth of a patient with the tube connected to a valve which is connected via a tubing to a source of vacuum. Again, in this manner, debris may be removed from the mouth of the patient. After the dental procedure, the tube is disposed of and the valve should be sterilized for reuse. However, although it is suggested to sterilize the valve after use, it is known that this suggested procedure is hardly ever followed.

As can be appreciated, the saliva ejector and the high volume evacuator are used to remove liquids and debris from a mouth of a patient to prevent a patient from swallowing or aspirating liquids and debris produced during a dental procedure. However, during the dental procedure other matter, such as an aerosol cloud, is generated. The aerosol cloud may contain micro-droplets of matter such as small tissue, small bone fragments, bits of metals, and fluids such as saliva or blood, which become airborne and mist or splatter all over the room, equipment, patient, or medical personnel. Any production or distribution of the aerosol cloud should be avoided or prevented because it may contain contagious viruses or other organisms that could be transferred to a dentist or other dental personnel. The generation of the aerosol cloud is dangerous and undesirable and should be avoided.

Therefore, it would be desirable to have a disposable dental aerosol device that captures any aerosol produced during a dental procedure for preventing aerosol from contacting or contaminating a patient, a dentist, a dental room, or dental equipment. It would also be desirable to have a disposable dental aerosol device that is easy to install on or remove from a dental valve attached to suction tubing connected to a source of vacuum. Further, it would be advantageous to have a disposable dental aerosol device that is adjustable in order to control suctioning strength when required during a dental procedure.

BRIEF SUMMARY

In one form of the present disclosure, a disposable dental aerosol device comprises a tube having a tip end having a tip having a tip opening, a valve receiving end having a rear end opening, and an aerosol directing device having an aerosol collecting funnel, a first vane, a second vane, a first aerosol capturing port formed between the first vane and the second vane, and a second aerosol capturing port formed between the second vane and the first vane.

In another form of the present disclosure, a disposable dental aerosol device comprises a tube having a tip end having a tip having a tip opening, a valve receiving end having a rear end opening, and an aerosol directing device having an aerosol collecting funnel, a first vane, a second vane, a third vane, and a fourth vane, a first aerosol capturing port formed between the first vane and the second vane, a second aerosol capturing port formed between the second vane and the third vane, a third aerosol capturing port formed between the third vane and the fourth vane, and a fourth aerosol capturing port formed between the fourth vane and the first vane.

In yet another form of the present disclosure, a disposable dental aerosol device comprises a tube having a tip end having a tip having a tip opening, a valve receiving end having a rear end opening, and an aerosol directing device having a first vane, a second vane, a first aerosol capturing port formed between the first vane and the second vane, and a second aerosol capturing port formed between the second vane and the first vane.

The present disclosure provides a disposable dental aerosol device for use with a dental instrument that is suitable for one time use and may be discarded after a single use.

The present disclosure provides a disposable dental aerosol device that is easy to install on a dental valve connected to suction tubing which is in turn connected to a source of vacuum.

The present disclosure provides a disposable dental aerosol device that is small, lightweight, easy to handle, easy to install, and easy to operate.

The present disclosure also provides a disposable dental aerosol device which is of simple construction and design and which can be easily employed with reliable results.

The present disclosure is related to a disposable dental aerosol device that does not require sterilization and captures aerosol to prevent contamination.

The present disclosure provides a disposable dental aerosol device that may have an antimicrobial agent or chemical incorporated into the device to prevent any bacterial growth on the device. The antimicrobial agent or chemical may also be a coating applied to the disposable dental aerosol device.

The present disclosure is related to a disposable dental aerosol that may be constructed of plastic that is recyclable or biodegradable to reduce the cost of the device and to allow the device to be disposable and discarded after a single use.

The present disclosure provides a disposable dental aerosol device that is used to capture any aerosol produced during a dental procedure for preventing aerosol from contacting or contaminating an individual, a dental room, or dental equipment.

The present disclosure is related to a disposable dental aerosol device that automatically suctions or captures any saliva, liquid, or other material produced during a dental procedure.

The present disclosure is also directed to a disposable dental aerosol device that is adjustable in order to control suctioning strength when required during a dental procedure.

The present disclosure provides a disposable dental aerosol device that may be used with a dental valve and does not require that the valve be retrofitted.

The present disclosure further provides a disposable dental aerosol device for use with a dental instrument that is adjustable and is suitable for one time use and may be discarded after a single use.

The present disclosure provides a disposable dental aerosol device that is easy to install on a dental valve connected to suction tubing which is in turn connected to a source of vacuum and has a tip installed on another end of the disposable dental aerosol device and the disposable dental aerosol device is adjustable to adjust vacuum.

The present disclosure provides a disposable dental aerosol device that is adjustable and may have an antimicrobial agent or chemical incorporated into the device to prevent any bacterial growth on the device. The antimicrobial agent or chemical may also be a coating applied to the disposable dental aerosol device.

The present disclosure provides a disposable dental aerosol device that is adjustable and is used to capture any aerosol produced during a dental procedure for preventing aerosol from contacting or contaminating an individual, a dental room, or dental equipment.

These and other advantages of the present disclosure will become apparent after considering the following detailed specification in conjunction with the accompanying drawings, wherein:

BRIEF DESCRIPTION OF THE DRAWINGS

FIG. 7 is a side view of the disposable dental aerosol device shown in FIG. 6 with the disposable dental aerosol device being installed on a tip and parts of the disposable dental aerosol device and the tip being shown in phantom;

FIG. 8 is a cross-sectional view of the disposable dental valve device shown in FIG. 7 taken along the plane of line 8-8;

FIG. 9 is a side perspective view of another embodiment of a disposable dental aerosol device constructed according to the present disclosure;

FIG. 10 is a side perspective view of another embodiment of a disposable dental aerosol device constructed according to the present disclosure;

DETAILED DESCRIPTION OF A PREFERRED EMBODIMENT

Figure 1:
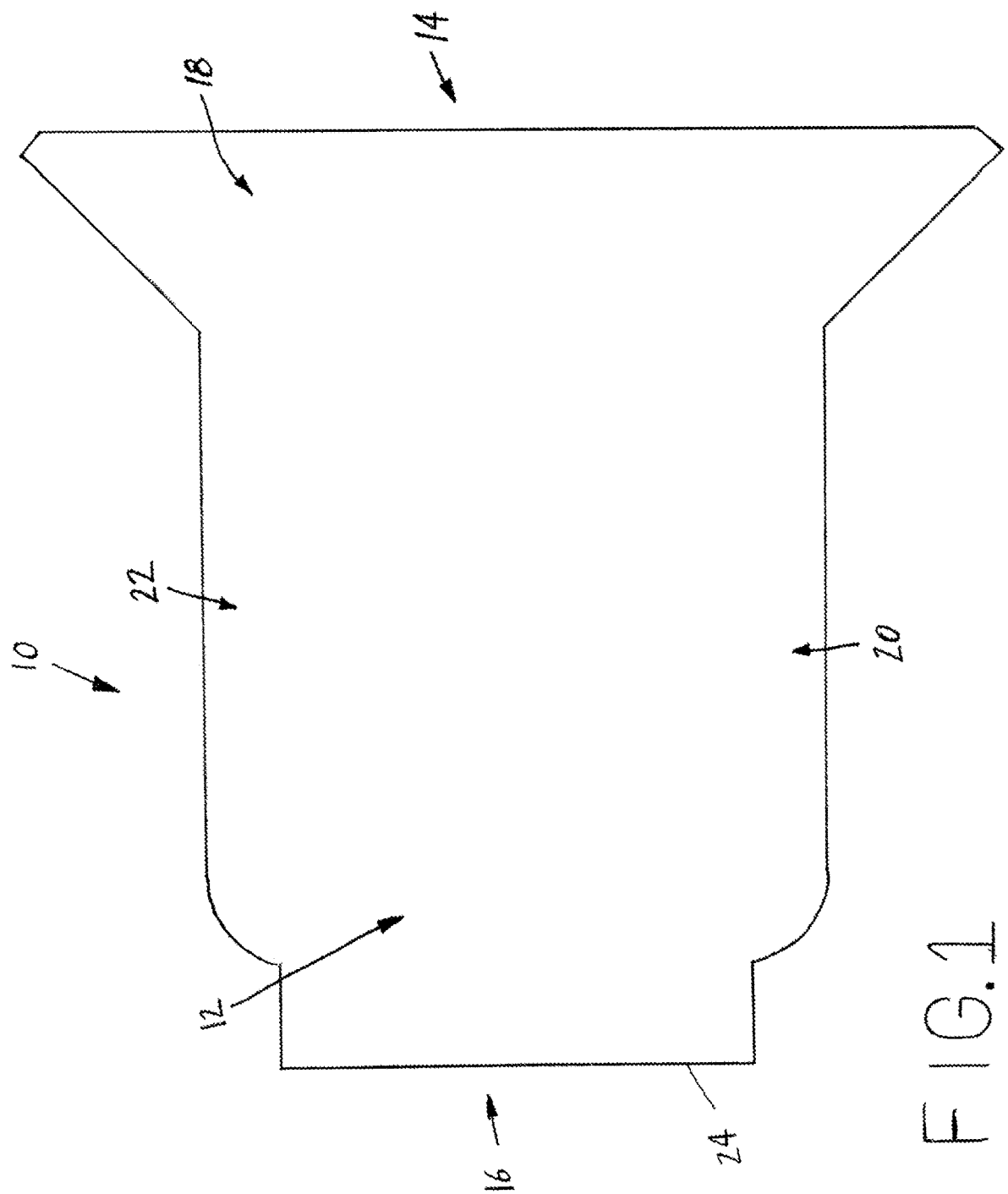
FIG. 1 is a side perspective view of a disposable dental aerosol device constructed according to the present disclosure.

Referring now to the drawings, wherein like numbers refer to like items, number 10 identifies a disposable dental aerosol device for use with a dental system (not shown) constructed according to the present disclosure. With reference now to FIG. 1, the device 10 comprises a body 12 having a tip receiving end 14, a valve receiving end 16, a funnel 18, a first aerosol capturing port 20, and a second aerosol capturing portion 22. Although the pair of ports 20 and 22 are shown, it is also possible and contemplated to have one port or more than a pair of ports. The tip receiving end 14 is adapted to receive an evacuator tip device or straw (not shown) such as a high volume evacuator or a low volume evacuator (saliva ejector). The funnel 18 flares outwardly from the body 12 and is wider than the body 12 to capture aerosol. The valve receiving end 16 is adapted to receive a dental valve (not shown) which is connected to a suction system (also not shown) which is used to dispose of any aerosol, saliva, liquid, or debris removed from a mouth of a patient during a dental procedure. The device 10 is constructed of material that allows the device 10 to be disposable and suitable for one time use. The valve receiving end 16 also has a circular stop 24 which may be used to position the device 10 within a dental valve. Although the funnel 18 is shown being circular at the tip receiving end 14, it is to be understood that the funnel 18 may be various other shapes such as rectangular, oval, triangular, or segmented. In any configuration the funnel 18 is flared outwardly and is wider than the body 12 to be able to capture aerosol. As should be appreciated, the device 10 is used with a suction system (not shown) which provides suction through an evacuator tip device, the device 10, and a hose so that any aerosol, debris, liquid, or saliva that is introduced into the device 10 and an evacuator tip device is removed through the device 10 and an evacuator tip device, a dental valve, and a hose when a movable valve sealing body associated with a dental valve is in an open state or a partially open state.

Figure 2:
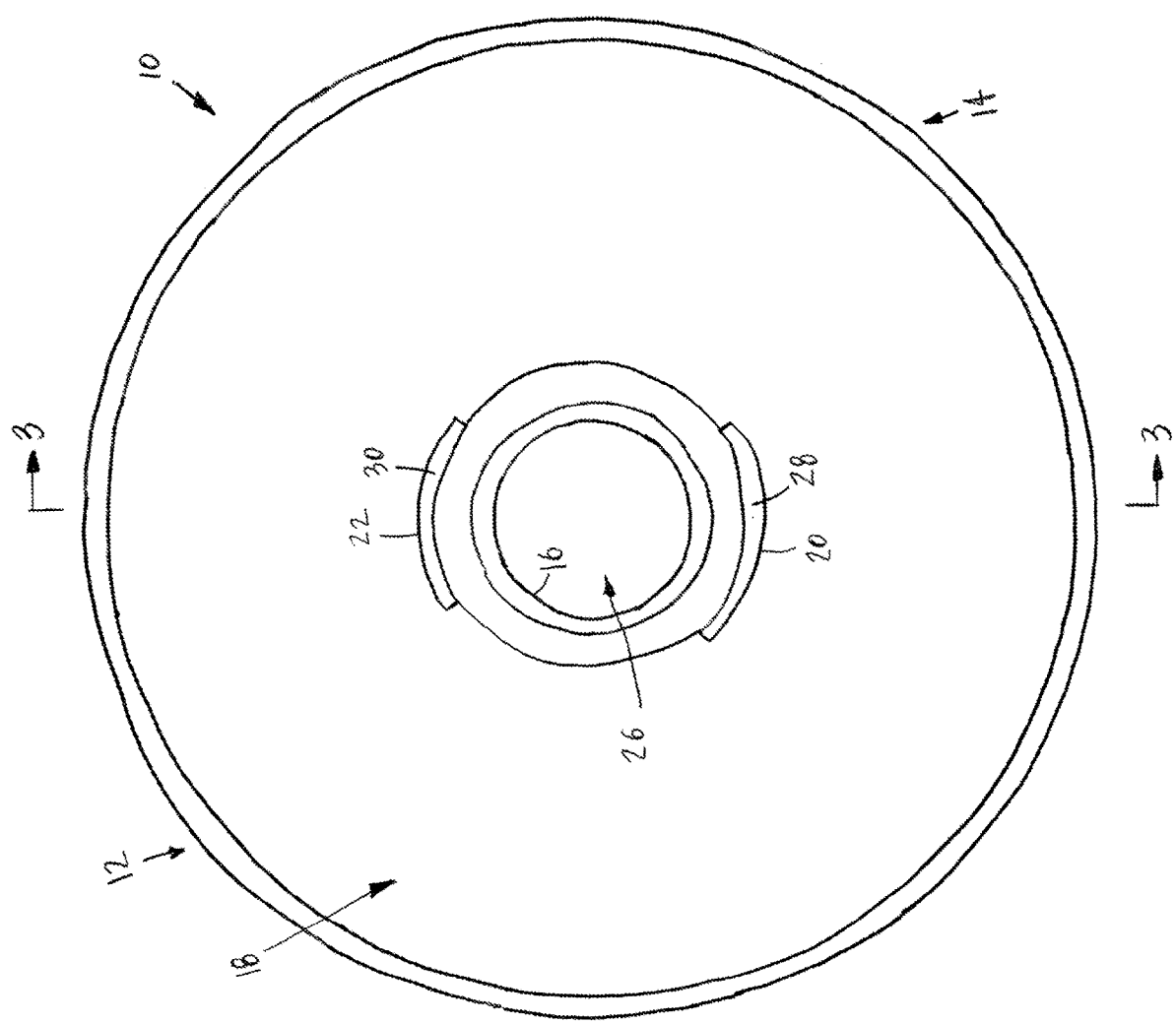
FIG. 2 is a front view of the disposable dental aerosol device constructed according to the present disclosure.

With reference now to FIG. 2, a front view of the disposable dental aerosol device 10 is illustrated. The device 10 comprises the body 12 having the tip receiving end 14, the valve receiving end 16, the funnel 18, the first aerosol capturing port 20, and the second aerosol capturing portion 22. The body 12 also has a central lumen 26 formed between the tip receiving end 14 and the valve receiving end 16. The first aerosol capturing port 20 has a first aerosol capturing port lumen 28. The second aerosol capturing port 22 has a second aerosol capturing port lumen 30.

Figure 3:
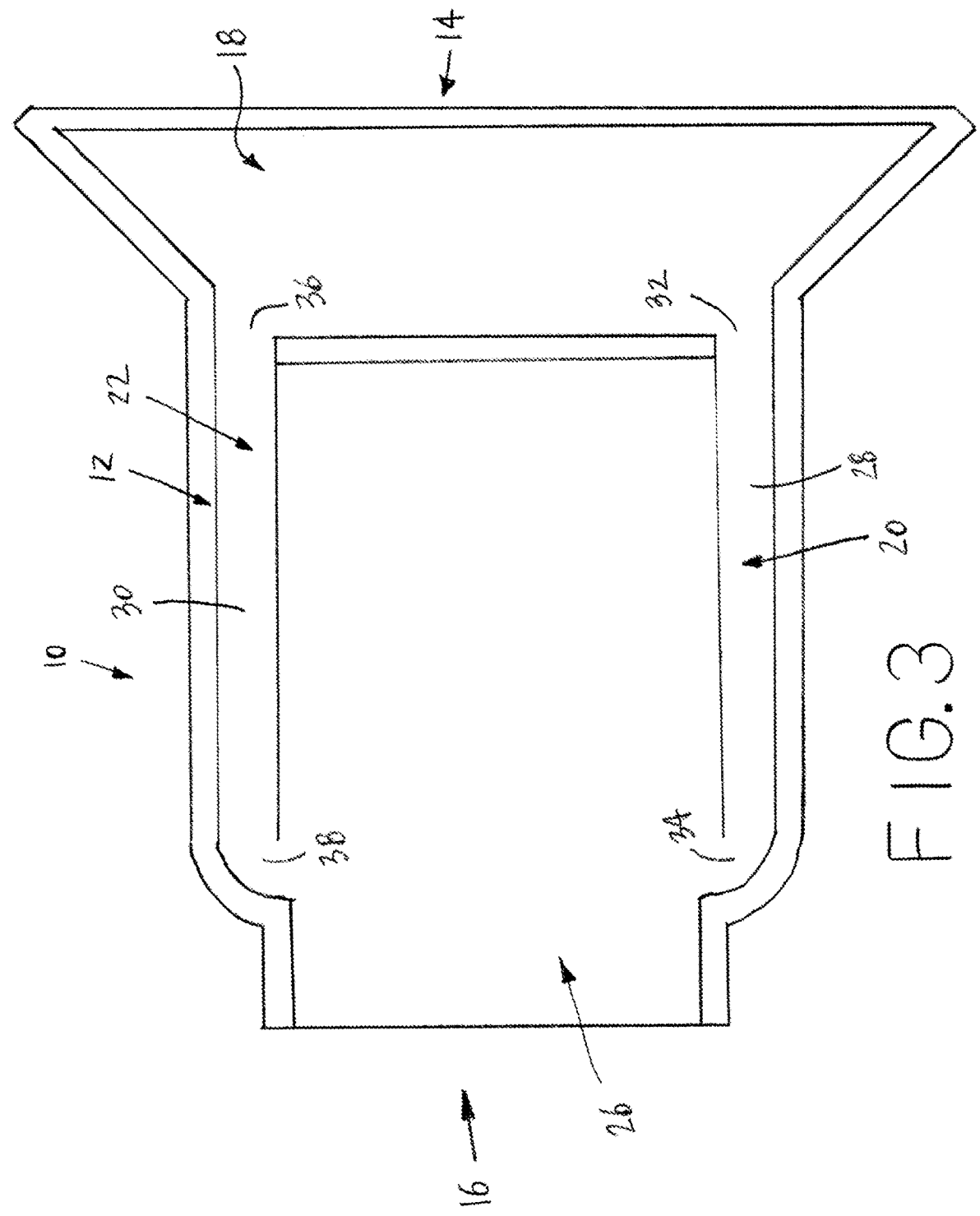
FIG. 3 is a cross-sectional view of the disposable dental aerosol device shown in FIG. 2 taken along the plane of line 3-3.

FIG. 3 depicts a cross-sectional view of the disposable dental aerosol device 10. The device 10 comprises the body 12 having the tip receiving end 14, the valve receiving end 16, the funnel 18, the first aerosol capturing port 20, and the second aerosol capturing portion 22. The body 12 also has a central lumen 26 formed between the tip receiving end 14 and the valve receiving end 16. The first aerosol capturing port 20 has the first aerosol capturing port lumen 28 that extends from a first port entrance opening 32 formed in the funnel 18 to a first port exit opening 34 formed in the central lumen 26. The second aerosol capturing port 22 has the second aerosol capturing port lumen 30 that extends from a second port entrance opening 36 formed in the funnel 18 to a second port exit opening 38 formed in the central lumen 26. As can be appreciated, aerosol is suctioned through the funnel 18 through either the port entrance openings 32 or 36 through either the lumen 28 or 30 out either the port exit openings 34 or 38 into the central lumen 26. As will be discussed in further detail herein, a tip may be inserted into the central lumen 26. However, the tip is not long enough to interfere or block the exit openings 34 or 38 so that aerosol may flow into the central lumen 26 and out the valve receiving end 16.

Figure 4:
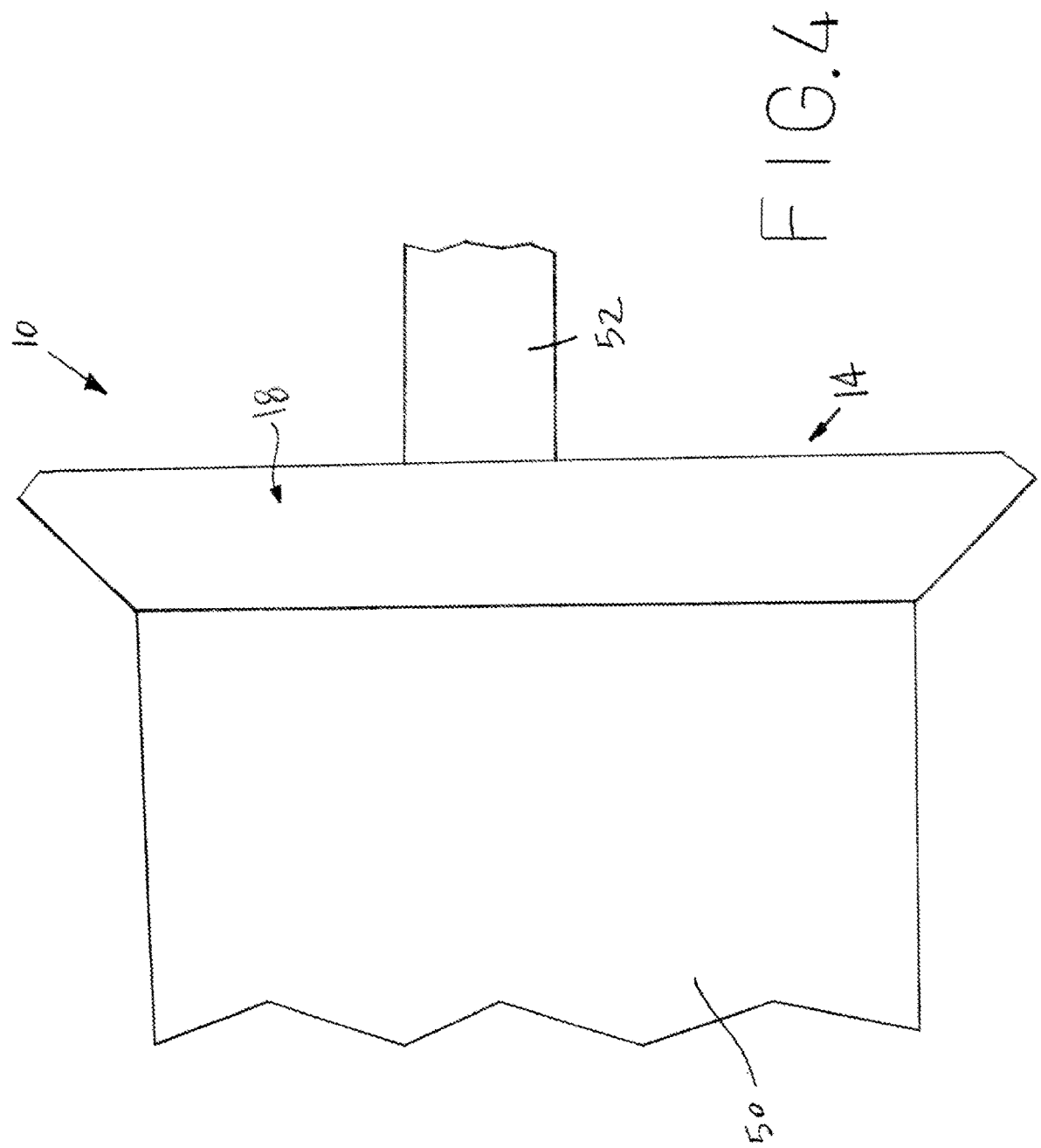
FIG. 4 is a side view of the disposable dental aerosol device constructed according to the present disclosure being inserted into a dental valve, shown in partial view, and having a tip inserted into the disposable dental aerosol device with a partial side view of the tip being shown.

With reference now to FIG. 4, the disposable dental aerosol device 10 is shown being inserted into a dental valve device 50. Although not shown, as is known, the dental valve device 50 may be connected to a tailpiece which is connected to a tubing or hose which is connected to a suction system within a dental facility. The suction system is used to provide suction to the dental valve 50 and to dispose of any material, such as fluids and solids, that are suctioned into the dental valve 50, the tailpiece, and the tubing. A tip 52, such as an evacuator tip device or straw such as a high volume evacuator or a low volume evacuator (saliva ejector), is inserted into the tip receiving end 14 of the device 10. In this manner, aerosol (not shown) may be captured by the funnel 18 to be suctioned through the device 10 and the dental valve 50 into the suction system for disposal. Also, the funnel 18 is shown to be flared outwardly from the dental valve 50 and the funnel 18 is wider than the dental valve 50 to be able to capture aerosol that is suctioned into the device 10. Once a dental procedure is completed, the disposable dental aerosol device 10, the dental valve 50, and the tip 52 may be discarded.

Figure 5:
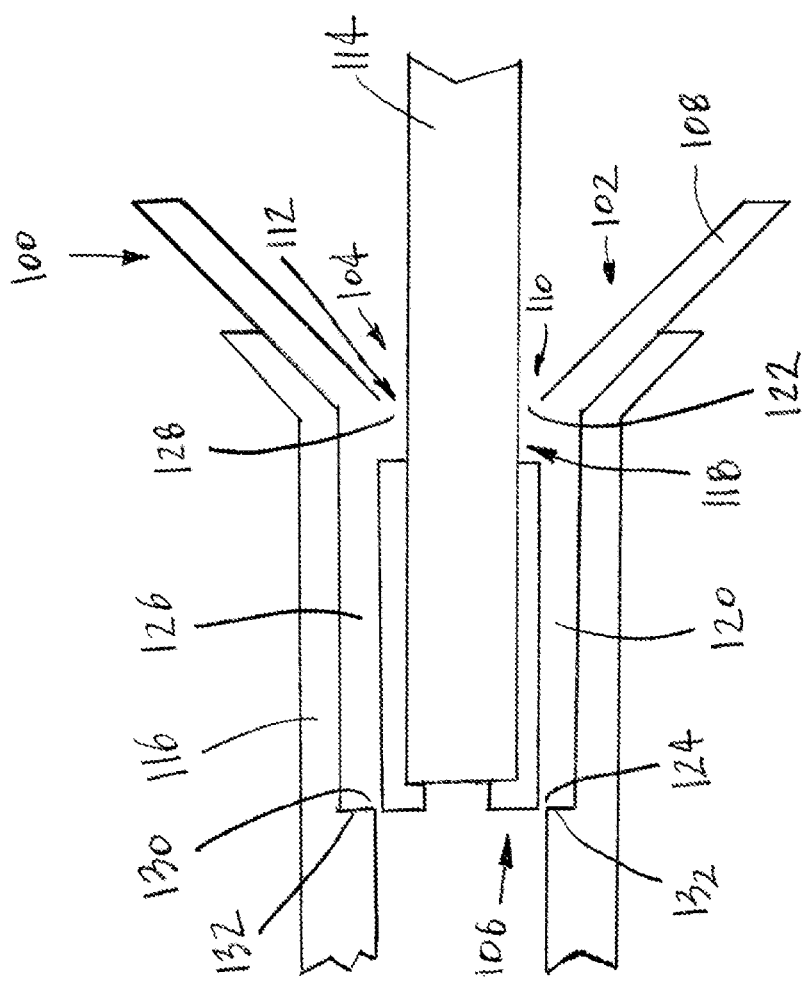
FIG. 5 is a cross-sectional view of another embodiment of a disposable dental aerosol device constructed according to the present disclosure being inserted into a dental valve, shown in partial view, and having a tip inserted into the disposable dental aerosol device with a partial side view of the tip being shown.

FIG. 5 shows another embodiment of a disposable dental aerosol device 100 constructed according to the present disclosure which provides for being able to adjust suction or vacuum during use. The device 100 comprises a body 102 having a tip receiving end 104, a valve receiving end 106, a funnel 108, a first aerosol capturing port 110, and a second aerosol capturing portion 112. Although the pair of ports 110 and 112 are shown, it is also possible and contemplated to have one port or more than a pair of ports. The tip receiving end 104 is adapted to receive a tip 114 such as an evacuator tip device or straw such as a high volume evacuator or a low volume evacuator (saliva ejector). The funnel 108 flares outwardly from the body 102 and is wider than the body 102 to capture aerosol. The valve receiving end 106 is adapted to receive a dental valve 116 which is connected to a suction system (not shown) which is used to dispose of any aerosol, saliva, liquid, or debris removed from a mouth of a patient during a dental procedure. The device 100 is constructed of material that allows the device 100 to be disposable and suitable for one time use. The valve receiving end 106 also has a circular stop 118 which may be used to position the device 10 within a dental valve. Although the funnel 108 is shown being circular at the tip receiving end 104, it is to be understood that the funnel 108 may be various other shapes such as rectangular, oval, triangular, or segmented. In any configuration the funnel 108 is flared outwardly and is wider than the body 102 and the dental valve 116 to be able to capture aerosol. As should be appreciated, the device 100 is used with a suction system (not shown) which provides suction through the tip 114, the device 100, and the dental valve 116 so that any aerosol, debris, liquid, or saliva that is introduced into the device 100 is removed through the device 100 when a movable valve sealing body associated with the dental valve 116 is in an open state or a partially open state.

The body 102 has a central lumen 118 formed between the tip receiving end 104 and the valve receiving end 106. The central lumen 118 is used to receive the tip 114. The first aerosol capturing port 110 has a first aerosol capturing port lumen 120 that extends from a first port entrance opening 122 formed in the funnel 108 to a first port exit opening 124 formed in the valve receiving end 106. The second aerosol capturing port 112 has a second aerosol capturing port lumen 126 that extends from a second port entrance opening 128 formed in the funnel 108 to a second port exit opening 130 formed in the valve receiving end 106. As can be appreciated, aerosol is suctioned through the funnel 108 through either the port entrance openings 122 or 128 through either the lumen 120 or 126 out either the port exit openings 124 or 130 into the dental valve 116. The device 100 is adjustable within the dental valve 116. In particular, the dental valve 116 has a circular ledge 132 which the valve receiving end 106 may abut. When the valve receiving end 106 is adjacent to the ledge 132, any suction being generated by the suction system is restricted or reduced. The device 100 may be moved within the dental valve device 116 to move the valve receiving end 106 away from the ledge 132 to increase suction. In this manner, the device 100 is adjustable and capable of increasing or decreasing suction. Once a dental procedure is completed, the disposable dental aerosol device 100, the tip 114, and the dental valve 116 may be discarded.

Figure 6:
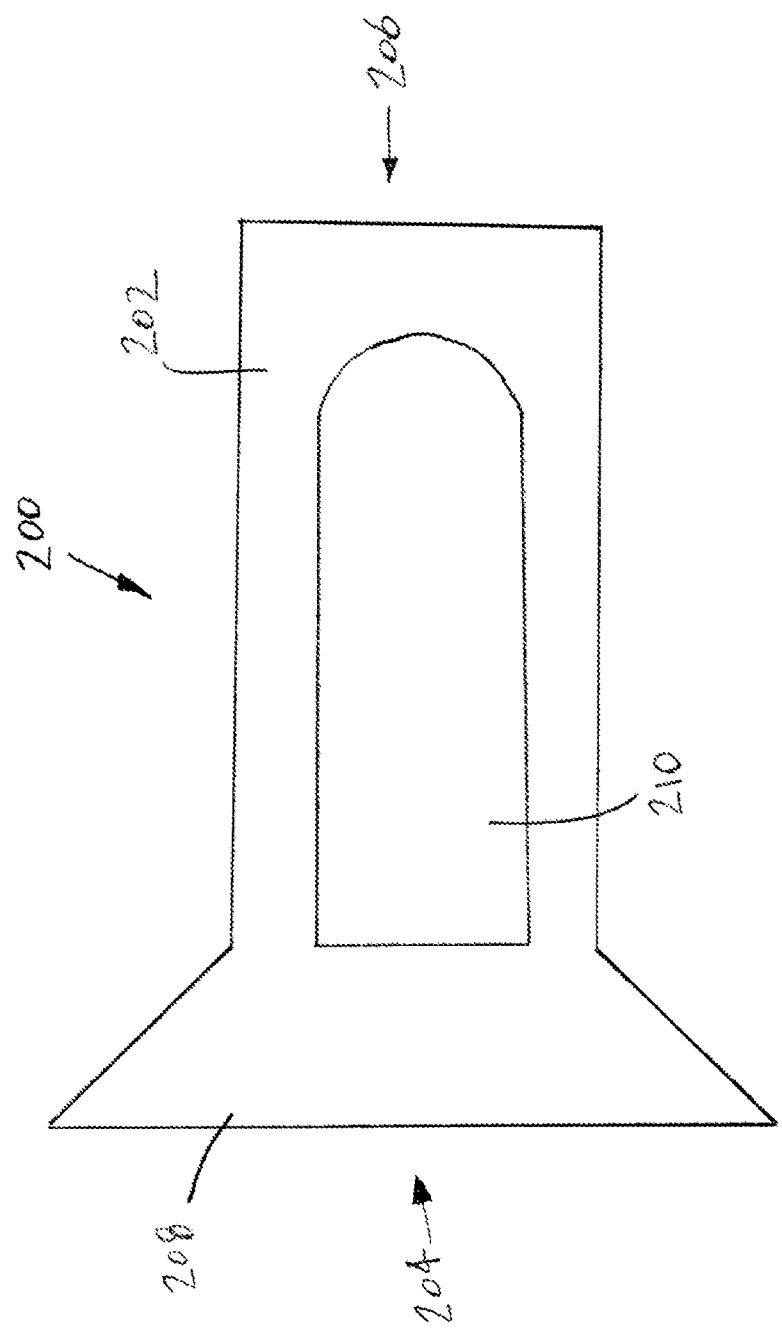
FIG. 6 is a side view of another embodiment of a disposable dental aerosol device constructed according to the present disclosure.

With particular reference now to FIG. 6, another embodiment of a disposable dental aerosol device 200 is illustrated. The disposable dental aerosol device 200 comprises a body 202 having a front end 204, a rear end 206, a funnel 208, and an aerosol capturing port 210. Although one port 210 is shown, it is also possible to have more than the one port 210. The body 202 is adapted to receive an evacuator tip device or straw (not shown) such as a high volume evacuator or a low volume evacuator (saliva ejector) through the body 202. The tip device is similar to currently available tip devices with the exception of having a hole or an aperture formed in a side of the tip device, as will be explained further herein. The funnel 208 flares outwardly from the body 202 and is wider than the body 202 to capture aerosol. The device 200 is constructed of material that allows the device 200 to be disposable and suitable for one time use. Although the funnel 208 is shown being circular at the front end 204, it is to be understood that the funnel 208 may be various other shapes such as rectangular, oval, triangular, or segmented. In any configuration the funnel 208 is flared outwardly and is wider than the body 202 to be able to capture aerosol. As should be appreciated, the device 200 is used with a suction system (not shown) which provides suction so that any aerosol, debris, liquid, or saliva that is introduced into the device 200 is removed through the device 200.

FIG. 7 shows a side view of the disposable dental aerosol device 200 being inserted on a tip 220. The tip 220 has an aperture 222 formed in a side 224 of the tip 220. The aperture 222 is shown in phantom since the body 202 is covering the tip 220. Although the aperture 222 is shown, it is also possible that the aperture 222 may take on various other configurations such as a slot, a rectangle, an oval, or any other sized and shaped opening that can be selectively covered and uncovered. The aerosol capturing port 210 is also shown in phantom. The aerosol capturing port 210 is used to selectively cover and uncover the aperture 222 to be able to adjust suction. For example, when aerosol is not present, the device 200 may be adjusted or twisted so that the aerosol capturing port 210 is not inline with the aperture 222. In this event, the aperture 222 is covered by the body 202. However, when suction is needed because aerosol is present or being generated, the aerosol capturing port 210 may be moved to be in alignment with the aperture 222 so that aerosol may flow through the aerosol capturing port 210 and the aperture 222.

Referring to FIG. 8, a cross-sectional view of the disposable dental aerosol device 200 and the tip 220 are illustrated. The tip 220 has the aperture 222 formed in the side 224 of the tip 220. The aperture 222 is shown being partially covered by the body 202 of the device 200. The aerosol capturing port 210 is partially over the aperture 222. The aerosol capturing port 210 is used to selectively cover and uncover the aperture 222 to be able to adjust suction.

FIG. 9 depicts another embodiment of a disposable dental aerosol device 300 constructed according to the present disclosure. The disposable aerosol device 300 comprises a body 302 having a front end 304, a rear end 306, and an aerosol capturing port 308. Although one port 308 is shown, it is also possible to have more than the one port 308. The body 302 is adapted to receive an evacuator tip device or straw (not shown), such as the tip 220 (FIG. 7), such as a high volume evacuator or a low volume evacuator (saliva ejector) through the body 302. One difference between the device 200 and the device 300 is that there is no funnel at the front end 304 of the device 300. The port 308 is used to capture aerosol. The device 300 is constructed of material that allows the device 300 to be disposable and suitable for one time use. As should be appreciated, the device 300 is used with a suction system (not shown) which provides suction so that any aerosol, debris, liquid, or saliva that is introduced into the device 300 is removed through the tip 220 (FIG. 7) when the device 300 is installed over the tip 220. Further, suction may be adjusted by turning or twisting the port 308 relative to the aperture 222 (FIG. 7).

With particular reference now to FIG. 10, another embodiment of a disposable dental aerosol device 400 constructed according to the present disclosure. The disposable aerosol device 400 comprises a body 402 having a front end 404, a rear end 406, and a first aerosol capturing port 408, a second aerosol capturing port 410, a third aerosol capturing port 412, and a fourth aerosol capturing port 414. The body 402 is adapted to receive an evacuator tip device or straw (not shown), such as the tip 220 (FIG. 7), such as a high volume evacuator or a low volume evacuator (saliva ejector) through a lumen 416 formed in the body 402. One difference between the device 200 and the device 400 is that there is no funnel at the front end 404 of the device 400. The ports 408, 410, 412, and 414 are used to capture aerosol. The device 400 is constructed of material that allows the device 400 to be disposable and suitable for one time use. As should be appreciated, the device 400 is used with a suction system (not shown) which provides suction so that any aerosol, debris, liquid, or saliva that is introduced into the device 400 is removed through the tip 220 (FIG. 7) when the device 400 is installed over the tip 220. Further, suction may be adjusted by turning or twisting the ports 408, 410, 412, and 414 relative to the aperture 222 (FIG. 7). As can be appreciated, the tip 220 may be constructed having four apertures and the ports 408, 410, 412, and 414, may be used to cover or uncover the apertures to adjust suction and aerosol captured by the device 400.

Figure 11:
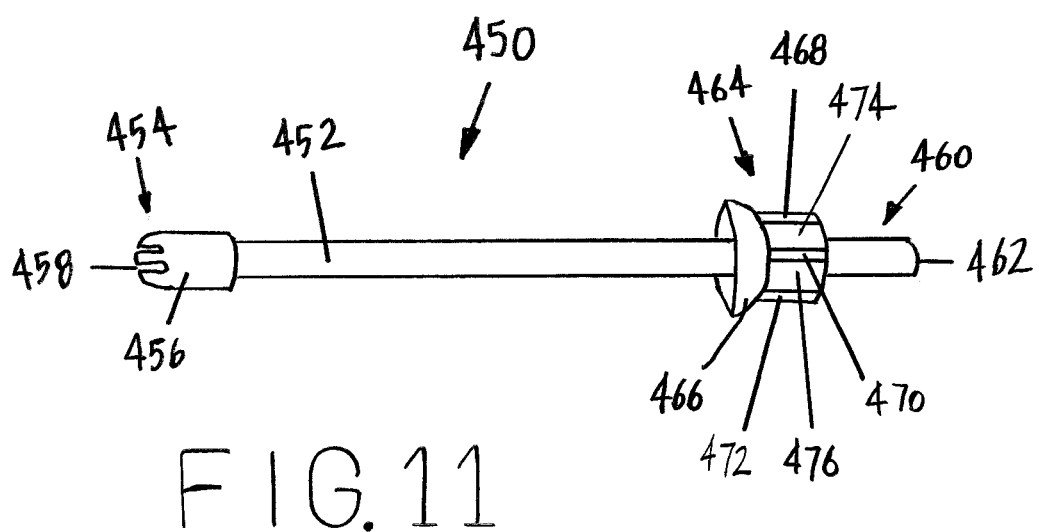
FIG. 11 is a side perspective view of another embodiment of a disposable dental aerosol device constructed according to the present disclosure.

FIG. 11 illustrates another embodiment of a disposable dental aerosol device 450. The disposable dental aerosol device 450 comprises a tube or flexible tubing 452 having a first, front, or tip end 454 having a tip 456 having a tip opening 458, a second, rear, or valve receiving end 460 having a rear end opening 462, and an aerosol directing device 464. The aerosol directing device 464 has an aerosol collecting funnel 466, a first vane 468, a second vane 470, and a third vane 472. Although the three vanes 468, 470, and 472 are shown in this particular view, as will be described in further detail herein, there is a fourth vane that is obstructed in this view. A first aerosol capturing port or channel 474 is formed between the first vane 468 and the second vane 470. A second aerosol capturing port of channel 476 is formed between the second vane 470 and the third vane 472. Again, as will be discussed herein, there are other ports or channels associated with the aerosol directing device 464. The funnel 466 may flare outwardly and is wider than the tube 452 to capture aerosol. The valve receiving end 460 is adapted to be inserted into a dental valve, such as the dental valve 116 shown in FIG. 5. The device 450 is connected to a suction system (not shown) through the valve 116 with the suction system being used to dispose of any aerosol, saliva, liquid, or debris removed from a mouth of a patient during a dental procedure. The device 450 is constructed of material that allows the device 450 to be disposable and suitable for one time use. It is contemplated that only two vanes, such as the first vane 468 and the third vane 472, are required to provide two aerosol capturing ports or channels.

Figure 12:
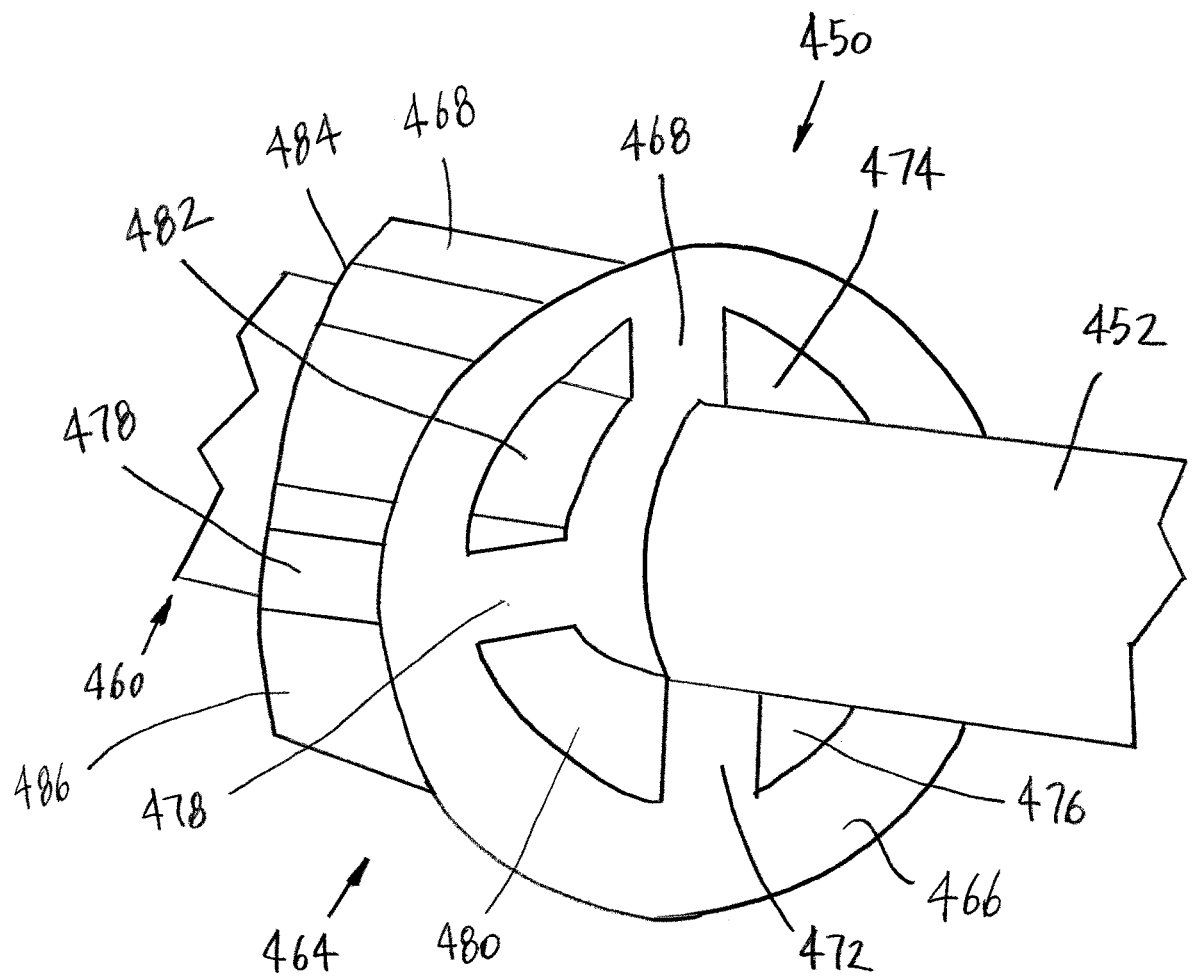
FIG. 12 is an enlarged partial front perspective view of the disposable dental aerosol device shown in FIG. 11.

Referring now to FIG. 12, an enlarged partial view of the disposable dental aerosol device 450 is depicted. The device 450 has the tube 452, the valve receiving end 460, the aerosol directing device 464. The aerosol directing device 464 has the aerosol collecting funnel 466 having the first vane 468, the third vane 472, and a fourth vane 478. As indicated, the fourth vane 478 was obscured in FIG. 11 and in this view the second vane 470 is hidden by the tube 452. The first aerosol capturing port 474 and the second aerosol capturing port 476 are shown. A third aerosol capturing port or channel 480 is formed between the third vane 472 and the fourth vane 478. A fourth aerosol capturing port or channel 482 is formed between the fourth vane 478 and the first vane 468. The vanes 468, 470 (FIG. 11), 472 and 478 extend back to a back end 484. Each of the aerosol capturing ports 474, 476, 480, and 482 extends from the funnel 466 to the end 484. The ports 474, 476, 480, and 482 are each a lumen in which any aerosol (not shown) may enter into the ports 474, 476, 480, and 482 and be suctioned into the dental valve 116 (FIG. 5). The aerosol directing device 464 also has a circular body 486 through which the tube 452 passes through and extends out of to form the valve receiving end 460 having the rear end opening 462. In essence, saliva, liquid, or debris removed from a mouth of a patient during a dental procedure passes through the tube 452 from the tip opening 458 to the rear end opening 462.

Figure 13:
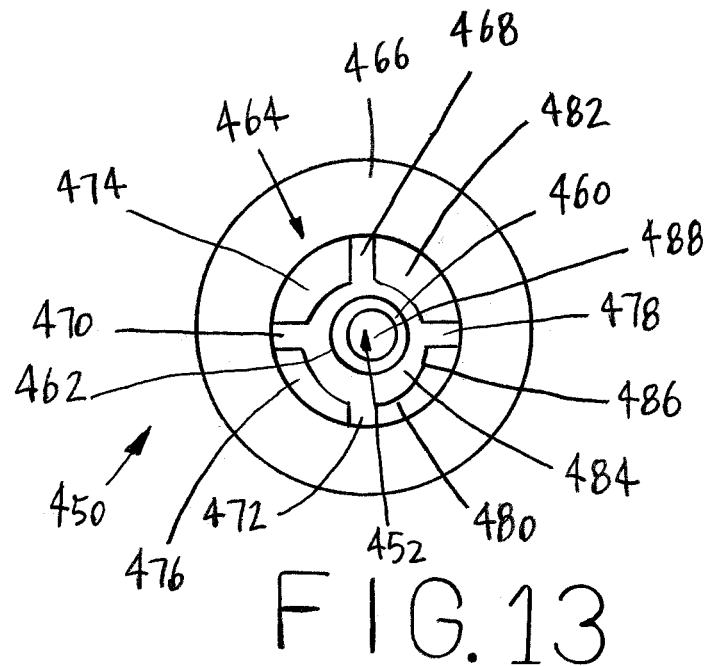
FIG. 13 is an enlarged rear view of the disposable dental aerosol device shown in FIG. 11.

FIG. 13 illustrates an enlarged rear view of the disposable dental aerosol device 450. The device 450 has the valve receiving end 460 of the tube 452 extending out from the end 484 of the aerosol directing device 464. The funnel 466 is shown flaring outwardly from the aerosol directing device 464. The aerosol directing device 464 also has the first vane 468, the second vane 470, the third vane 472, and the fourth vane 478 positioned around the circular body 486. The first aerosol capturing port 474 is formed between the first vane 468 and the second vane 470. The second aerosol capturing port 476 is formed between the second vane 470 and the third vane 472. The third aerosol capturing port 480 is formed between the third vane 472 and the fourth vane 478. The fourth aerosol capturing port 482 is formed between the fourth vane 478 and the first vane 468. The vanes 468, 470, 472, and 474 and the aerosol capturing ports 474, 476, 480, and 482 extend from the funnel 466 to the end 484. The tube 452 also has a lumen 488 that is formed between the tip opening 458 (FIG. 11) and the rear end opening 462. Saliva, liquid, or debris removed from a mouth of a patient during a dental procedure passes through the lumen 488 in the tube 452 from the tip opening 458 to the rear end opening 462. Also, aerosol will pass through the aerosol capturing ports or channels 474, 476, 480, and 482.

Figure 14:
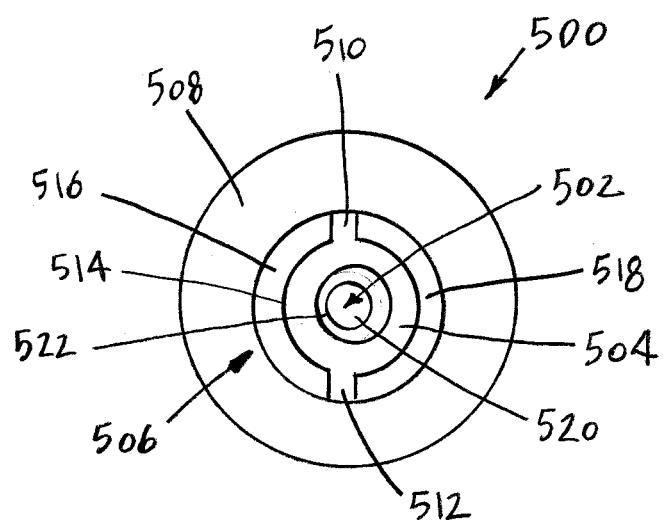
FIG. 14 is a rear view of another embodiment of a disposable dental aerosol device constructed according to the present disclosure.

With reference now to FIG. 14, a rear view of another embodiment of a disposable dental aerosol device 500 is depicted. The device 500 is similar in construction to the device 450 except that only two vanes are present. The device 500 comprises a tube 502 having a valve receiving end 504 extending out from an aerosol directing device 506. A funnel 508 is shown flaring outwardly from the aerosol directing device 506. The aerosol directing device 506 also has a first vane 510 and a second vane 512 positioned around a circular body 514. A first or left aerosol capturing port 516 is formed between the first vane 510 and the second vane 512. A second or right aerosol capturing port 518 is formed between the first vane 510 and the second vane 512. The vanes 510 and 512 and the aerosol capturing ports 516 and 518 extend from the funnel 508 to the end 504. The tube 502 also has a lumen 520 that is formed therein between a tip opening (not shown) and a rear end opening 522. Saliva, liquid, or debris removed from a mouth of a patient during a dental procedure passes through the lumen 520 in the tube 502 and out the rear end opening 522. Also, aerosol will pass through the aerosol capturing ports or channels 516 and 518.

Figure 15:
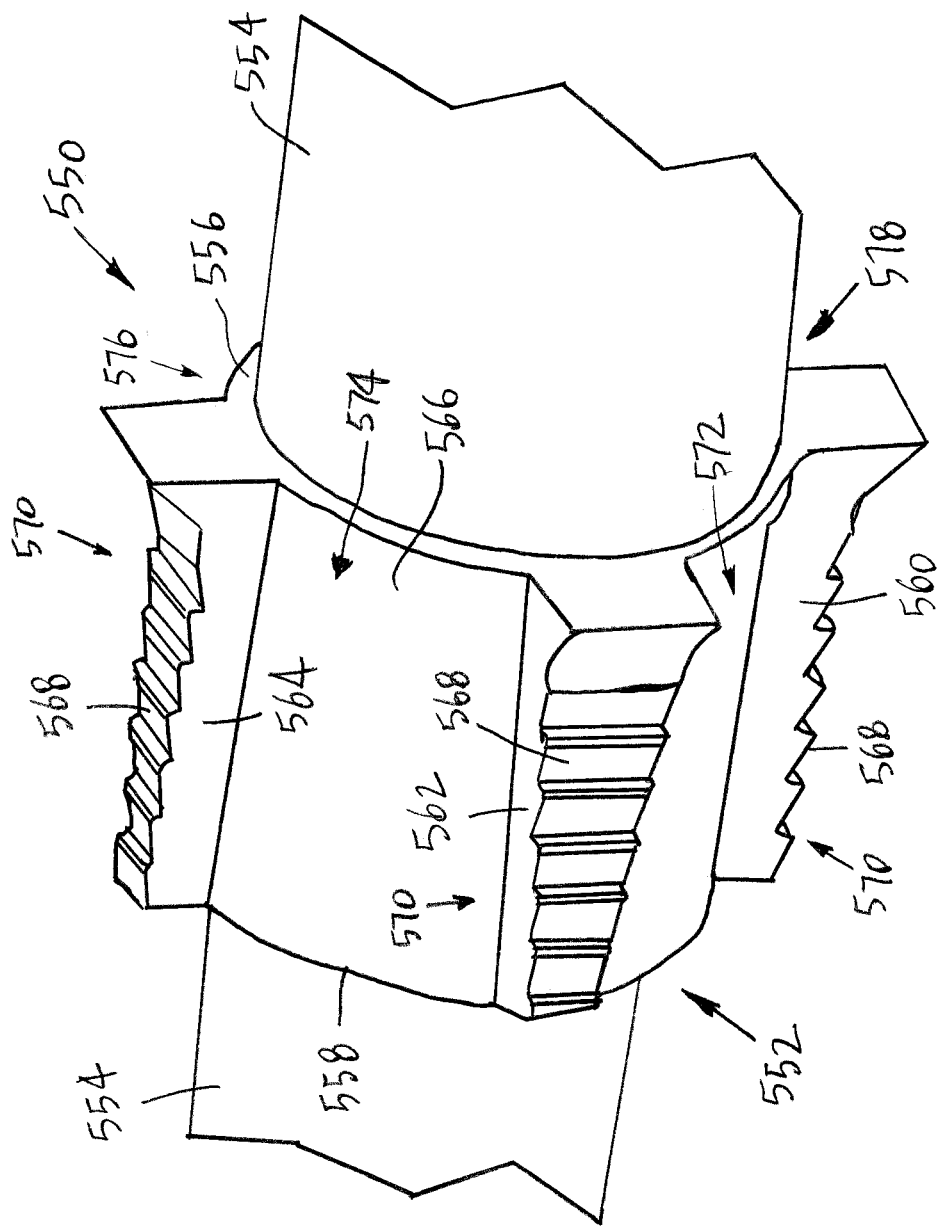
FIG. 15 is a side perspective view of another embodiment of a disposable dental aerosol device constructed according to the present disclosure.

FIG. 15 shows another embodiment of a disposable dental aerosol device 550 constructed according to the present disclosure. The disposable dental aerosol device 550 comprises an aerosol directing device 552 having a tube 554 extending out from an aerosol directing device front end 556 and a rear end or valve receiving end 558. As should be appreciated, the tube 554 is similar in design and construction as the tube 452 shown in FIG. 11. A first vane or fin 560, a second vane or fin 562, and a third vane or fin 564 extend out from a circular body portion 566 of the aerosol directing device 552. Although only three vanes 560, 562, and 564 are shown, it is to be understood that there is a fourth vane that is hidden by the tube 554. The vanes 560, 562, and 564 extend from the front end 556 to the rear end 558. Although the vanes 560, 562, and 564 are shown and another vane is described, it is to be understood that less or more vanes may be employed. Each of the vanes 560, 562, and 564 may have a series of saw toothed ridges 568 along a length 570 of each of the vanes 560, 562, and 564. The ridges 568 are used to secure the device 550 within a valve (not shown). A first aerosol capturing port 572 is formed between the first vane 560 and the second vane 562. A second aerosol capturing channel 574 is formed between the second vane 562 and the third vane 564. A third aerosol capturing channel 576 is formed between the third vane 564 and the hidden and unnumbered fourth vane. A fourth aerosol capturing channel 578 is formed between the hidden fourth vane and the first vane 560. The aerosol capturing channels 572, 574, 576, and 578 are formed along the circular body portion 566 of the aerosol directing device 552. Aerosol (not shown) may flow through the aerosol capturing channels 572, 574, 576, and 578. The device 550 is constructed of material that allows the device 550 to be disposable and suitable for one time use. As should be now recognized, the device 550 is inserted into a dental valve which is connected to a suction or vacuum system (not shown) which provides suction so that any aerosol, debris, liquid, or saliva that is introduced into the device 550 is removed through the aerosol capturing channels 572, 574, 576, and 578 and the tube 554. Further, a difference between the devices 450 and 500 and the device 550 is that the device 550 functions without the use or requirement of a funnel.

Figure 16:
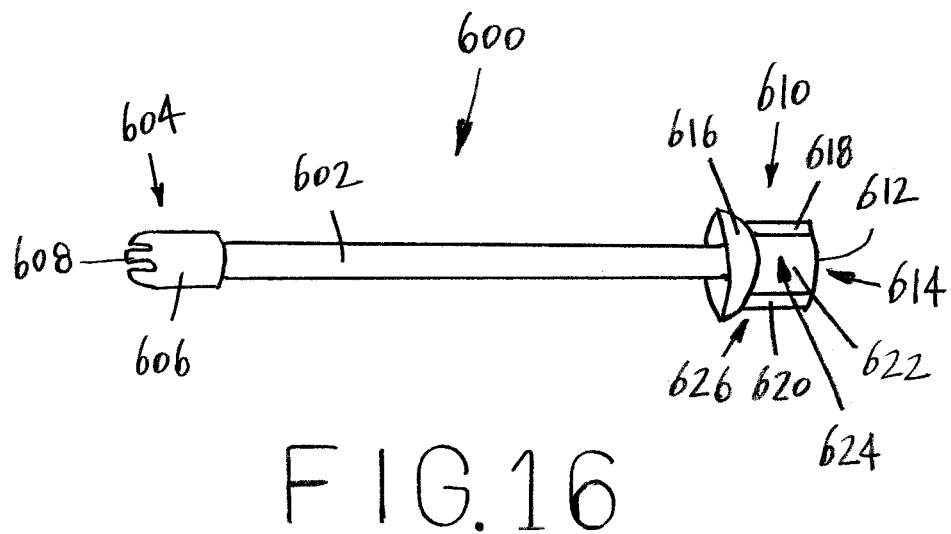
FIG. 16 is a side perspective view of another embodiment of a disposable dental aerosol device constructed according to the present disclosure.

Referring to FIG. 16, another embodiment of a disposable dental aerosol device 600 is illustrated. The disposable dental aerosol device 600 comprises a tube or flexible tubing 602 having a front or tip end 604 having a tip 606 having a tip opening 608, and an aerosol directing device 610 with the aerosol directing device 610 having a rear or valve receiving end 612 having a rear end opening 614. The aerosol directing device 610 has an aerosol collecting funnel 616, a first vane 618, and a second vane 620 with the vanes 618 and 620 extending out from a circular body 622. The aerosol collecting funnel 616 may flare outwardly from the body 622 and is wider than the tube 602 and the body 622. Although the two vanes 618 and 620 are shown in this particular view, it is contemplated that more or less vanes may be employed. A first or left side aerosol capturing port or channel 624 is formed between the first vane 618 and the second vane 620. A second or right side aerosol capturing port of channel 626 is formed between the second vane 620 and the first vane 618. The valve receiving end 612 is adapted to be inserted into a dental valve, such as the dental valve 116 shown in FIG. 5. The device 600 is connected to a suction system (not shown) through the valve 116 with the suction system being used to dispose of any aerosol, saliva, liquid, or debris removed from a mouth of a patient during a dental procedure. As should be recognized, the tube 602 is also used to suction saliva, liquid, or other debris from a mouth of a dental patient. The device 600 is constructed of material that allows the device 600 to be disposable and suitable for one time use.

Figure 17:
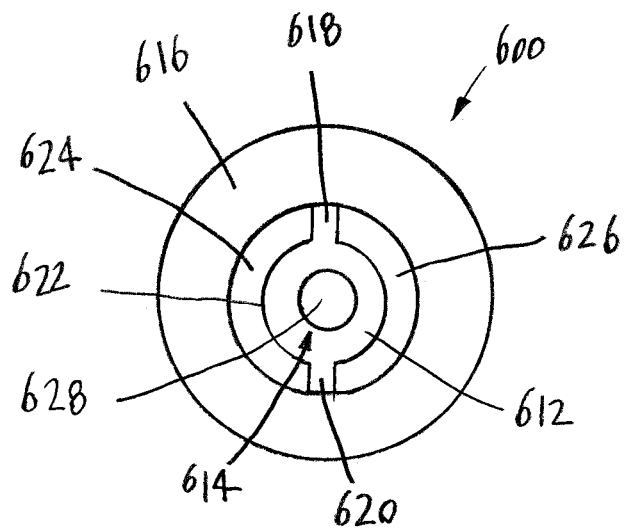
FIG. 17 is an enlarged partial front perspective view of the disposable dental aerosol device shown in FIG. 16.

FIG. 17 depicts an enlarged partial rear view of the disposable dental aerosol device 600 shown in FIG. 16. The device 600 has the aerosol directing device 610 having the valve receiving end 612. The funnel 616 is shown flaring outwardly from the body 622 of the aerosol directing device 610. The aerosol directing device 610 also has the first vane 618 and the second vane 620 positioned around the circular body 622. The first or left side aerosol capturing port 624 is formed between the first vane 618 and the second vane 620. The second or right side aerosol capturing port 626 is formed between the second vane 620 and the first vane 618. The vanes 618 and 620 and the aerosol capturing ports 624 and 626 extend from the funnel 616 to the end 612. The body 622 of the aerosol directing device 610 also has a lumen 628 that is formed therein. Saliva, liquid, or debris removed from a mouth of a patient during a dental procedure passes through the lumen 628 and out the rear end opening 614. Also, aerosol will pass through the aerosol capturing ports or channels 624 and 626 to be disposed of through the suction system.

The disposable dental aerosol devices 10, 100, 200, 300, 400, 450, 500, 550, and 600 may be formed of any suitable material such as plastic, paper, polyethylene, and high density polyethylene or any other suitable material that is disposable and/or recyclable. Any suitable plastic may be used to construct the devices 10, 100, 200, 300, 400, 450, 500, 550, and 600 so that the devices 10, 100, 200, 300, 400, 450, 500, 550, and 600 may withstand use in a dental operation or procedure. It is also possible and contemplated to incorporate an antimicrobial agent or chemical in the plastic or to provide a coating of an antimicrobial agent on the plastic to further prevent cross-contamination when using the devices 10, 100, 200, 300, 400, 450, 500, 550, and 600. As can be appreciated, the antimicrobial agent may be incorporated into any of the components of the devices 10, 100, 200, 300, 400, 450, 500, 550, and 600.

From all that has been said, it will be clear that there has thus been shown and described herein a disposable dental aerosol device which fulfills the various advantages sought therefore. It will become apparent to those skilled in the art, however, that many changes, modifications, variations, and other uses and applications of the subject disposable dental aerosol device are possible and contemplated. All changes, modifications, variations, and other uses and applications which do not depart from the spirit and scope of the disclosure are deemed to be covered by the disclosure, which is limited only by the claims which follow.

What is claimed is:

1. A disposable dental aerosol device comprises:
a tube having a tip end having a tip having a tip opening, a valve receiving end having a valve receiving end rear end opening; and
an aerosol directing device having a circular body having an exterior surface, a lumen, a back end, an aerosol collecting funnel, a first vane extending out from the exterior surface of the circular body extending entirely along the circular body from the aerosol collecting funnel to the back end, a second vane extending out from the exterior surface of the circular body extending entirely along the circular body from the aerosol collecting funnel to the back end, a first aerosol capturing port formed between the first vane and the second vane extending entirely along the circular body through the aerosol collecting funnel to the back end, wherein the circular body is configured to be connected to a valve to direct aerosol into the first aerosol capturing port, a second aerosol capturing port formed between the second vane and the first vane extending entirely along the circular body through the aerosol collecting funnel to the back end, wherein the circular body is configured to be connected to a valve to direct aerosol into the second aerosol capturing port, and the tube extending from the tip end through the lumen of the circular body and out of the back end of the circular body.

2. The disposable dental aerosol device of claim 1 wherein the aerosol collecting funnel flares outwardly from the aerosol directing device.

3. The disposable dental aerosol device of claim 1 wherein the aerosol directing device is constructed of plastic.

4. The disposable dental aerosol device of claim 1 wherein the first vane has a series of saw tooth ridges.

5. The disposable dental aerosol device of claim 1 wherein the second vane has a series of saw tooth ridges.

6. The disposable dental aerosol device of claim 1 wherein the first vane has a length and a series of saw tooth ridges extending along the length.

7. The disposable dental aerosol device of claim 1 wherein the funnel flares outwardly from the body and the funnel is wider than the body to capture aerosol.

8. A disposable dental aerosol device comprises:
a tube having a tip end having a tip having a tip opening, a valve receiving end having a valve receiving end rear end opening; and
an aerosol directing device having a circular body having an exterior surface, a lumen, a back end, an aerosol collecting funnel, a first vane extending out from the exterior surface of the circular body extending entirely along the circular body from the aerosol collecting funnel to the back end, a second vane extending out from the exterior surface of the circular body extending entirely along the circular body from the aerosol collecting funnel to the back end, a third vane extending out from the exterior surface of the circular body extending entirely along the circular body from the aerosol collecting funnel to the back end, and a fourth vane extending out from the exterior surface of the circular body extending entirely along the circular body from the aerosol collecting funnel to the back end, a first aerosol capturing port formed between the first vane and the second vane extending entirely along the circular body through the aerosol collecting funnel to the back end, wherein the circular body is configured to be connected to a valve to direct aerosol into the first aerosol capturing port, a second aerosol capturing port formed between the second vane and the third vane extending entirely along the circular body through the aerosol collecting funnel to the back end, wherein the circular body is configured to be connected to a valve to direct aerosol into the second aerosol capturing port, a third aerosol capturing port formed between the third vane and the fourth vane extending entirely along the circular body through the aerosol collecting funnel to the back end, wherein the circular body is configured to be connected to a valve to direct aerosol into the third aerosol capturing port, a fourth aerosol capturing port formed between the fourth vane and the first vane extending entirely along the circular body through the aerosol collecting funnel to the back end, wherein the circular body is configured to be connected to a valve to direct aerosol into the fourth aerosol capturing port, and the tube extending from the tip end through the lumen of the circular body and out of the back end of the circular body.

9. The disposable dental aerosol device of claim 8 wherein the aerosol directing device is constructed of plastic.

10. The disposable dental aerosol device of claim 8 wherein the first vane has ridges.

11. The disposable dental aerosol device of claim 8 wherein the second vane has ridges.

12. The disposable dental aerosol device of claim 8 wherein the fourth vane has ridges.

13. The disposable dental aerosol device of claim 8 wherein the third vane has ridges.

14. The disposable dental aerosol device of claim 8 wherein each of the vanes has ridges.

\* \* \* \* \*